Feb. 27, 1945. N. YOUNG 2,370,218
AUTOMATIC THREAD CHASING ATTACHMENT
Filed Dec. 30, 1943
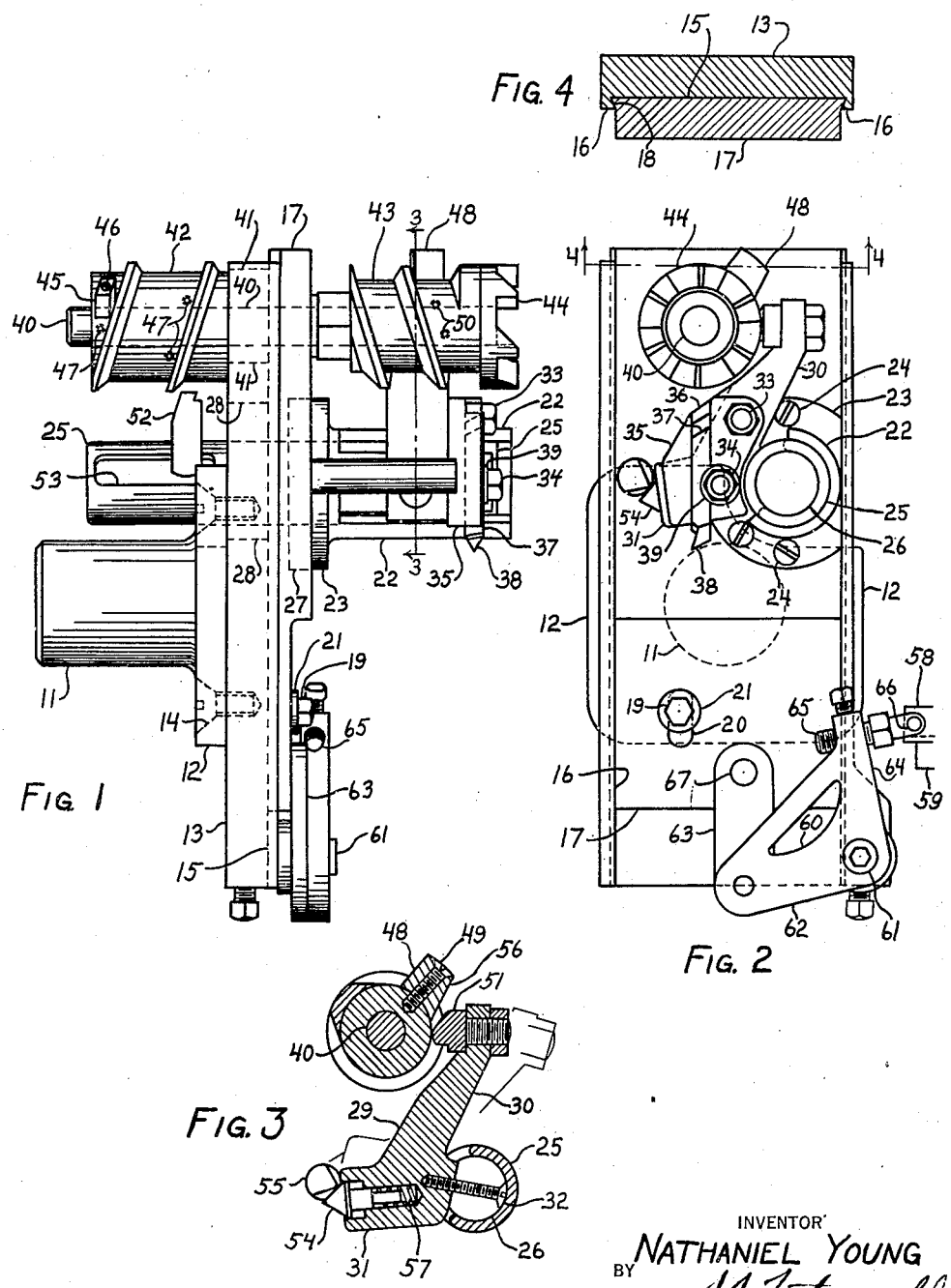
INVENTOR
NATHANIEL YOUNG
BY
ATTORNEY Patented Feb. 27, 1945

2,370,218

UNITED STATES PATENT OFFICE 2,370,218

AUTOMATIC THREAD CHASING ATTACHMENT

Nathaniel Young, Kittery, Maine

Application December 30, 1943, Serial No. 516,184

8 Claims. (Cl. 10—101)

(Granted under the act of March 3, 1883, as amended April 30, 1928; 370 O. G. 757)

This invention relates to machinery for chasing threads, of the type wherein the cutting tool is automatically withdrawn from cutting position at the end of a cutting stroke, and returned to its position at the beginning of the cutting stroke, whereupon the tool is again shifted to the cutting position.

It is a principal object of this invention to provide a thread cutting attachment which can be mounted in a turret or tailstock of a lathe and be independently driven to engage the tool or chaser with the work and advance it along the work for the length of the desired thread, where it is withdrawn and returned to position at the beginning of the next cutting stroke.

Other objects will be apparent from the following description and accompanying drawing, in which:

Fig. 1 is a side view of the device in elevation;

Fig. 2 is an end view of the device in elevation;

Fig. 3 is a partial sectional view along line 3—3 of Fig. 1, looking in the direction of the arrows; and Fig. 4 is a partial sectional view along line 4—4 of Fig. 2, looking in the direction of the arrows.

As appears in Fig. 1, a shank 11 which fits into the turret or tailstock of a lathe, has an integral flange 12 to which is fastened a main support 13, as by screws 14 or the like. The main support is provided on one side with a recess 15 which forms longitudinal side rails or ways 16. The rails 16 are tapered outwardly towards their bases, as shown more clearly in Fig. 4. A slide 17, having outwardly projecting tapered flanges 18 is seated in the recess 15 for sliding movement, the taper of the rails 16 engaging the flanges 18 of the slide, whereby the slide is constrained to move in parallel relationship to the main support.

A cap screw 19 is tapped into the main support 13, and passes through an aligned vertical slot 20 in the slide 17. A washer 21 is provided between the head of the cap screw and the slide 17. The length of the movement of the slide 17 is thereby limited by the length of the slot 20, the cap screw 19 being tightened only sufficiently to allow the slide to operate freely. Instead of a cap screw, a stud could be threaded into the same tapped hole and a washer and nut placed on its outer end.

A cylindrical support or bushing 22 is mounted on the slide 17 by means of an integral flange 23 which may be recessed as at 27 into the face of slide 17 and fastened thereto by screws 24. The support 22 provides a guide and bushing for a cylindrical guide 25 and a reciprocable and rotatable shaft 26. As shown more clearly in Fig. 2, the shaft 26 is within the bore of guide 25, and the guide 25 is within the bore of the support 22. As will be explained, the shaft 26 has both a reciprocating and an oscillating rotary motion within the guide 25 and support 22. The main support 13 has a slot 28 wide enough for the passage of guide 25 therethrough, and long enough to allow for its vertical movement as it is shifted vertically by the movement of slide 17.

As shown in Figs. 1 and 2, the walls of support 22 and guide 25 are cut away or slotted through an angle of about 145 degrees, and for the greater portion of that part of their length away from slide 17.

These slots permit the attachment of a lever 29 to the shaft 26 as shown more clearly in Fig. 3. The lever 29 has an arm 30 extending upwardly, and an arm 31 extending forwardly, and at their juncture it has a flat portion which seats on a flat portion of shaft 26, the whole lever 29 being fastened to the shaft 26 as by screws 32.

Attached to the side of lever 29, as by nuts on the ends of studs 33 and 34, is a tool holder 35. The holder 35 has a substantially vertical slot 36 to receive a cutting tool 37 having a point 38. The slot 36 is not quite as deep as the tool 37 is wide, so that the side of the tool projects slightly above the surface of the holder 35. A washer 39 under the nut on stud 34 can then clamp the tool in place when the nut is tightened. Thus the tool 37 in its holder 35 will follow the movements of the lever 29 and shaft 26.

Suitably journaled in the slide 17 near its upper end is a shaft 40 which is parallel to the shaft 26 and passes through a slot 41 in the main support 13. A return worm drive 42 is suitably fixed to the shaft 40 on one side of the slide 17 and main support 13, and another worm drive 43 which may be termed the threading worm, is suitably fixed to the shaft 40 on the other side of the slide. A clutch 44 which may be dog toothed as shown, is also fastened to the shaft 40 at the outer end of worm 43. The worms on the drives 42 and 43 wind in opposite directions as appears in Fig. 1, and the shaft 40 with the worms thereon is turned in a clockwise direction when viewed as in Fig. 2.

A lug 45 is mounted on return worm 42 by means such as a machine screw 46 which is threaded into one of the tapped holes 47 disposed at spaced intervals along the helical thread of the worm 42. A plurality of tapped holes 47 is provided so that the lug 45 can be placed in any desired position along the length of the worm. The threading worm 43 is similarly provided with a lug 48 which is fastened thereto by means of a screw 49 threaded into one of a series of similarly spaced tapped holes 50.

Lug or cam 48 on worm 43 is adapted to engage a follower 51 which is fastened to the outer end of arm 30 on lever 29. The lug or cam 45 on worm 42 is adapted to engage a follower 52 which is fastened to the shaft 26 and protrudes through a slot 53 in the guide 25, as best shown in Fig. 1.

In operation, the lugs 45 and 48 engage the followers 52 and 51 respectively to shift the lever 29, tool holder 35 and the tool 37 into thread cutting position, and retracted position respectively. When the device is in the position shown in the drawing the shaft 26, lever 29, and the tool 37 are in their down, or thread-cutting position, and they are being moved toward the right by the engagement of the thread on the worm 43 with the follower 51 on the end of arm 30. A pointed, spring pressed plunger 54, seated in arm 31 of lever 30, bears against the underside of a detent 55, and thus resiliently keeps the lever 29 in the position shown in Fig. 3. When the shaft 40 and worm 43 rotate through a small angle from the position shown in Fig. 3, the face 56 of lug 48 will engage the follower 51 on arm 30 and rotate the shaft 26 and lever 29 with the tool 37 clockwise until the follower 51 is disengaged from the threads on worm 43 and follower 52 is placed in the path for engagement by the threads on worm 42. When this has occurred, the lever 29 has shifted to the position shown in the phantom lines in Fig. 3, and the spring pressed plunger 54 resiliently retains the lever in this position by bearing against the upper side of detent 55. The contours of plunger 54 and detent 55 and the strength of the spring 57 are such that while they do hold lever 29 in proper position during engagement of the worm threads with followers 51 and 52, they do not prevent the shifting of lever 29 by the action of lugs 45 and 48.

When lever 29 has shifted to the position shown in phantom lines in Fig. 3, the follower 52 is engaged by the thread on the worm 42, and the shaft 26 is moved to the left, carrying with it the lever 29, tool holder 35 and tool 37. The tool 37 is thereby carried back to a position at the beginning of its cutting stroke. The position of the beginning of the cutting stroke is determined by the position of the tapped hole 47 where lug 45 is fastened. As follower 52 moves to the left it is eventually engaged by the lug 45, which rotates shaft 26 counterclockwise, and the lever 29 and associated parts are returned to the relative position shown in Fig. 2, and in the full lines of Fig. 3, in which position the point 38 of tool 37 is lowered into cutting position.

The clutch 44 is driven by the same means that rotates the work in the lathe, so that the movement of the cutting tool 37 will be properly correlated with the rotation of the work. The clutch 44 may be connected to the lathe driving means by any well known device such as a change gear and a universal joint. The connecting means between the lathe drive and the clutch 44 is not shown because it does not form any part of the invention and any conventional means may be used.

It will be understood that the mechanism so far described as being carried by the slide 17, provides only for making repeated cuts at the same thread depth. In order to make successively deeper cuts into the work, the slide 17 itself must be advanced towards the work between cutting strokes of the tool. This is accomplished by connecting the slide 17 to means such as the cross-slide of the lathe on which the device is mounted. In Fig. 2 a cross-slide 58 is shown mounted on stationary ways 59. The cross-slide is moved to the left or right by a crank or other means not shown. A lever 60, pivotally mounted on the main support 13 by a pin 61 has one arm 62 connected to the slide by a link 63 and pin 67 and the other arm 64 adjustably connected to the cross-slide 59 by a bolt 65 which is threaded into arm 64 at one end and pivotally connected to the cross-slide at its other end by a pin 66. Movement of the cross-slide 58 towards the left in Fig. 2 therefore causes slide 17 to be moved downward, and the tool point 38 to take a deeper cut. Thus in order to cut a thread in a work piece by a series of cuts, each deeper than the last, the tool 37 should be lowered between cutting strokes by shifting the cross-slide 58 to the left after each cutting stroke. When the thread has been cut to its full depth, and before a thread is cut in the next work piece, the slide 17 must be raised back to its initial position by withdrawing the cross-slide 58 to the right.

The invention described herein may be manufactured and used by or for the Government of the United States of America for governmental purposes without the payment of any royalties thereon or therefor.

I claim:

1. A thread cutting device comprising a shaft mounted so as to have an oscillatory rotary and a longitudinally reciprocable motion; a tool holder mounted on said shaft for movement therewith; means for moving said shaft longitudinally at a constant rate during a threading stroke; means for rotating said shaft through part of a revolution at the end of a threading stroke and rendering said first mentioned means inoperative; means for moving said shaft longitudinally in the other direction; and means for rotating said shaft back to the position it has during a threading stroke and rendering said last mentioned means inoperative.

2. The device described in claim 1 wherein said first mentioned means comprises a worm drive and a lever attached to said shaft, said lever being operable to be moved into and out of engagement with said worm, whereby said shaft is moved longitudinally and rotatably.

3. The device described in claim 1 wherein the said means for moving said shaft longitudinally in either direction comprises a pair of worm drives; a pair of levers attached to said shaft in such position that only one lever engages its respective worm drive at a time; and means on each worm drive operative to disengage its respective lever from its worm drive, and to rotate said shaft to cause the other lever to engage its respective worm.

4. The device described in claim 1 wherein the said means for moving said shaft longitudinally in either direction comprises a pair of worm drives; a pair of levers attached to said shaft in such position that only one lever engages its respective worm drive at a time, means on each worm drive operative to disengage its respective lever from its worm drive, and to rotate said shaft to cause the other lever to engage its respective worm drive, and means operative to resiliently retain said levers in either of their two positions in engagement with their respective worms, said disengaging means on said worm drives being operable to overcome said resilient means when rotating said levers from one position to the other.

5. In the device described in claim 1, a main support attached to a shank for mounting in a turret of a lathe or the like, a slide reciprocably mounted in ways on said support, said shaft being journalled in said slide, and means operable to move said slide with respect to said support, whereby the position of said tool holder may be changed to increase the depth of cut of the tool from one thread chasing cycle to the next.

6. The device described in claim 1, wherein the said means for moving said shaft longitudinally in either direction comprises a pair of worm drives; a pair of levers attached to said shaft in such position that only one lever engages its respective worm drive at a time; and means on each worm drive operative to disengage its respective lever from its worm drive, and to rotate said shaft to cause the other lever to engage its respective worm, means being provided to position said last mentioned means along the length of each said worm drive.

7. The device described in claim 1 wherein the said means for moving said shaft longitudinally in either direction comprises a pair of worm drives and means operable to rotate said drives simultaneously in the same direction, the threads on said worm drives forming helixes of opposite directions, whereby the direction of the longitudinal movement of said shaft depends upon which worm drive is in driving engagement with the shaft at the time.

8. A thread cutting device adapted to be mounted on a lathe, comprising a main support having rails or ways forming guiding means; a slide mounted on said support so as to be movable along said ways; a shaft journalled in said slide so as to have an oscillatory rotary and a longitudinally reciprocable motion therein; a pair of parallel worm drives journalled in said slide at a point spaced from said shaft, the helixes on said worms running in opposite directions; a tool holder on said shaft; a pair of levers on said shaft, each operable to engage one of said worms whereby said shaft is moved longitudinally in either direction while the worms are rotated in one direction; means on said worms operable to disengage either lever from its respective worm drive and to rotate said shaft through part of a revolution to engage the other lever with its worm drive; means by which said worms can be driven in the same direction; and means by which the position of said slide with respect to said support can be changed, said last mentioned means being operable to retain said slide in any position with respect to said support.

NATHANIEL YOUNG.